July 24, 1934.  M. J. RICH  1,967,451
RECIPROCATING MOTOR
Filed Aug. 13, 1931  2 Sheets-Sheet 1
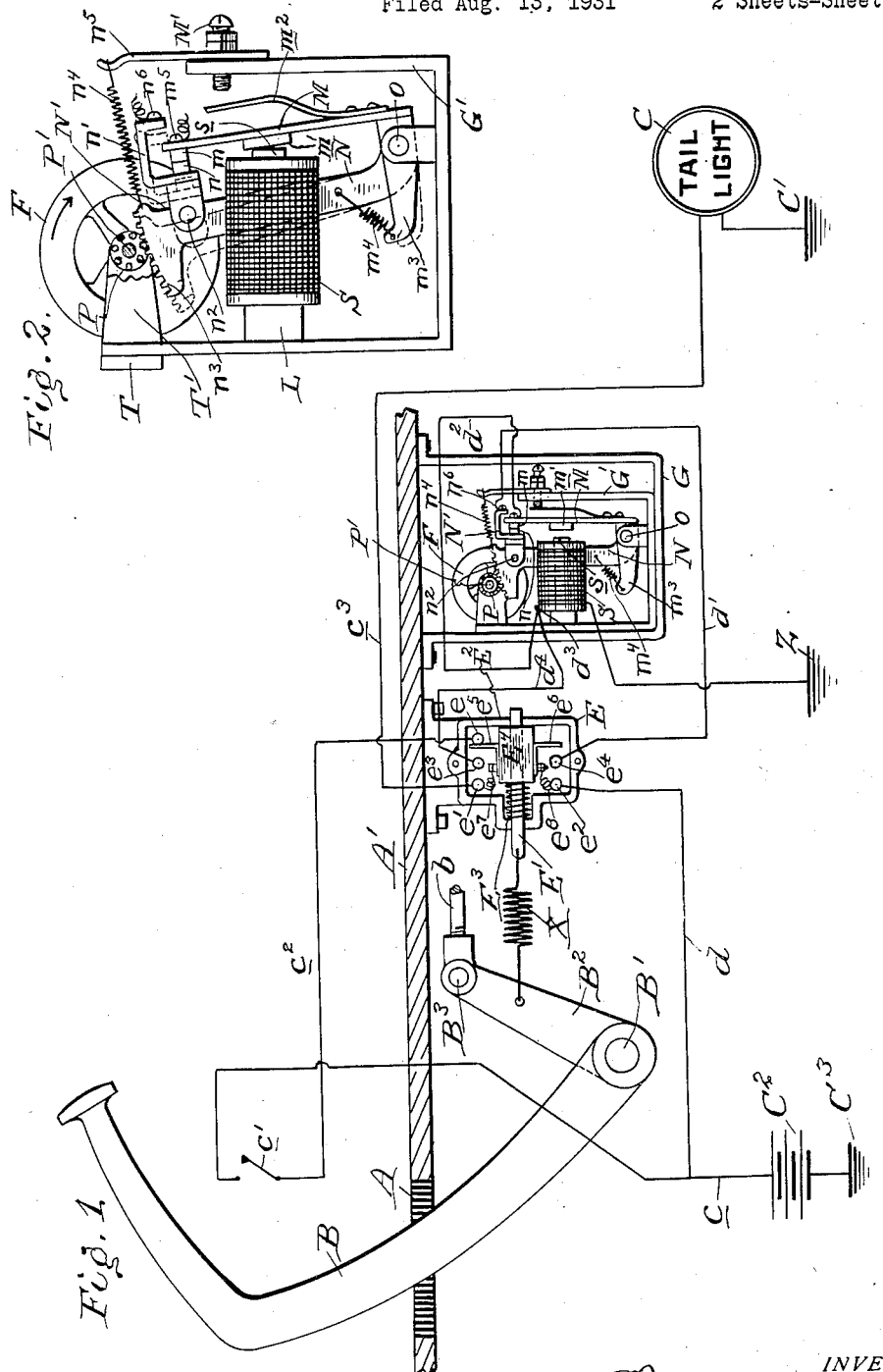

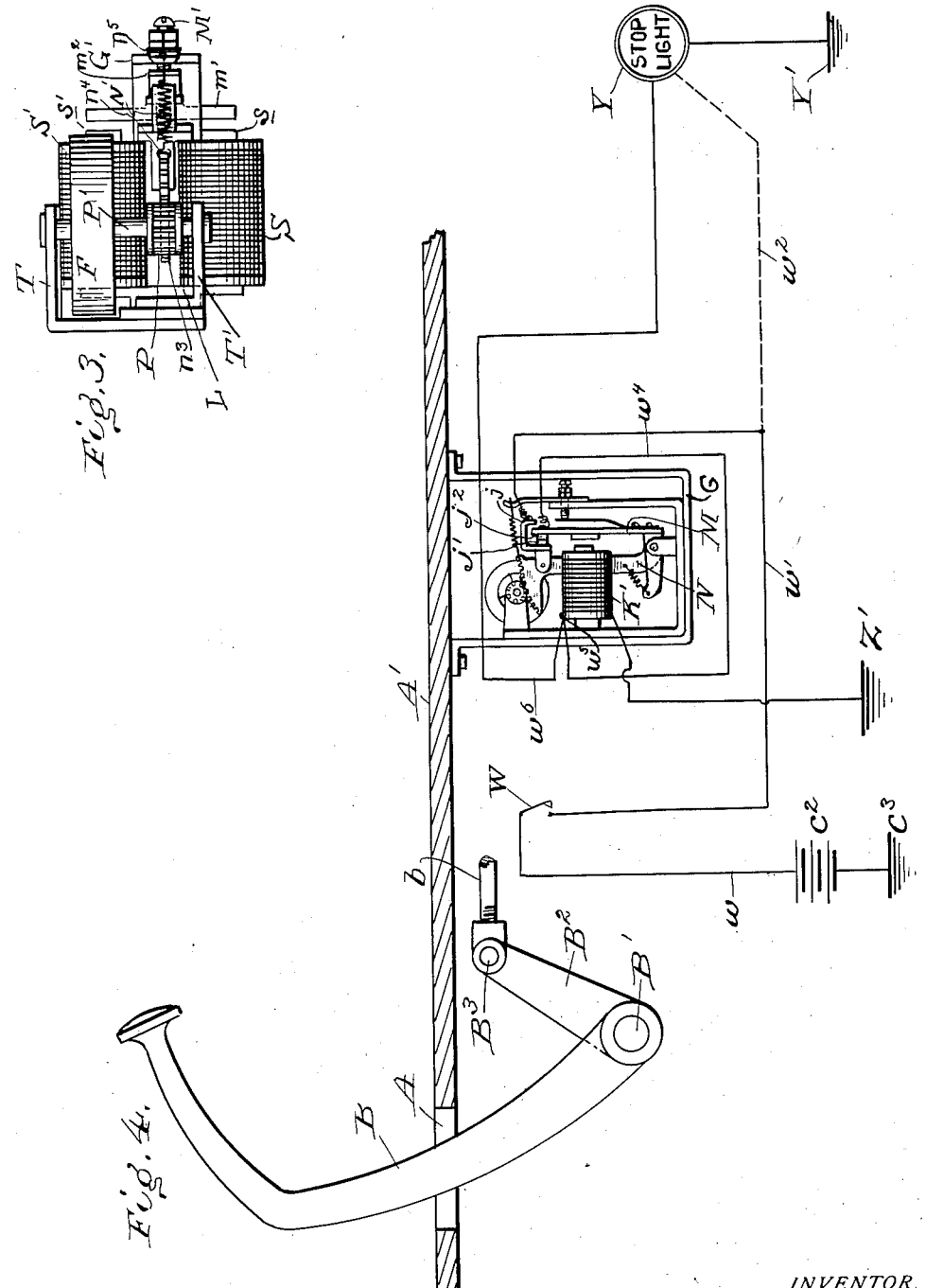

Patented July 24, 1934

1,967,451

UNITED STATES PATENT OFFICE 1,967,451

RECIPROCATING MOTOR

Marion J. Rich, Trenton, N. J.

Application August 13, 1931, Serial No. 556,775

9 Claims. (Cl. 172—126)

This invention relates to electric circuit interrupters and particularly to interrupters designed for automobile stop light systems.

It is well-known that a flashing light will attract attention much more readily than will a constantly burning light, and with this in mind many instruments have been devised which will operate alternately to open and close an electric circuit. However, the adaptation of these instruments to the stop light system of an automobile has not been extensive, chiefly because the instruments are too complicated in their construction and costly to manufacture, or will not stand the vibration of the automobile and the road shocks to which they are constantly exposed, or for other reasons are impractical.

It is an object of the present invention, therefore, to provide an electric circuit interrupter or flasher unit which is inexpensive to produce, rugged yet simple in its construction, and which is particularly adapted for use in connection with an automobile stop light system, and which, moreover, is dependable in its action.

It is a further object of the invention to provide an interrupter or flasher unit which can be readily installed in an automobile already in use and which is equipped with a stop light, or which may be installed in an automobile not having a stop light, whereby the rear or tail light may be used to perform not only its own proper function but also that of a stop light, thus obviating the necessity of providing an extra light.

It is a still further object of the invention to provide a mechanism of the character referred to which will utilize the tail light of an automobile as a flashing stop light, and which will be controlled by the braking system of the automobile; which will operate regardless of whether or not the tail light under control of the regular light switch is on or off; and which is not dependent in its operation upon thermo-sensitive elements.

To these ends, the invention contemplates a device comprising a plurality of movable contacts adapted alternately to open and close an electric circuit according to their relative movements. More specifically, the invention provides a device wherein two movable contact-bearing members, normally in contacting relation with each other, are arranged to be moved as a unit by a solenoid when the latter is energized, and wherein a flywheel actuated by one of the members in their unit movement is adapted by its momentum to increase or extend the movement of that member with respect to the other member, so that the two members are separated and the circuit momentarily opened, at which time the movable parts are returned to their normal positions of rest, and thereafter the cycle of operation repeated as long as an electrical current is passed thru the circuit.

In the accompanying drawings, the invention is shown merely by way of example and in its preferred form as applied to an automobile lighting system, but obviously many structural changes and modifications may be made therein and in its mode of application without departing from its spirit. It should be understood, therefore, that the invention is not to be limited to any specific form or embodiment except insofar as such limitations are specified in the appended claims.

Referring to the drawings:

Fig. 1 is a diagrammatical view showing the invention as incorporated in a tail light circuit of an automobile;

Fig. 2 is a side elevation of the improved interrupter, showing by the full lines the contact-bearing members moved by the solenoids, and showing by the dotted lines the increased movement of one of the contact-bearing members brought about by the momentum of the flywheel;

Fig. 3 is a top view of the improved circuit interrupter; and

Fig. 4 is a view similar to Fig. 1, showing the incorporation of the interrupter in an automobile stop light system.

The tail light of an automobile is ordinarily connected in circuit with the battery by a single wire hook-up, i. e., with the battery and tail light both grounded to the frame of the automobile, the current being carried by one wire only to a light switch (usually located on the instrument board) and from the switch directly to the tail light by means of but one wire. However, when the interrupter and special switch, which constitute the subject of the present invention, are installed in the circuit so that the tail light can be utilized also as a flashing stop signal, a primary circuit and a secondary circuit are established, the primary circuit being the direct hook-up just alluded to, and the secondary circuit being shunted therefrom and following a course thru the special switch and interrupter to the tail light, whereby, due to the action of the interrupter, the light is caused to flash periodically.

With the special switch and interrupter installed as illustrated in Fig. 1, the primary circuit consists of a tail light C, grounded as at C', a battery $C^2$, grounded as at $C^3$, and a special switch E, the current being conducted from the battery along wire $c$ to an instrument board control switch $c'$ (shown merely diagrammatically), thence along wire $c^2$ to the special switch, thru the latter from a lead-in contact $e$ to a lead-out connection $e'$ by means of a contact finger $e^5$ and a flexible wire $e^7$, and finally from the special switch directly to the tail light by wire $c^3$.

The secondary circuit, along which the current is conducted when the tail light is used as a flashing stop signal, is shunted from the wire $c$. Thus, when the primary circuit is broken and the secondary circuit closed, the current is carried by shunt wire $d$ to the switch E, thru which it is transmitted from a lead-in connection $e^2$ to a lead-out contact $c^4$ by a flexible wire $e^8$ and a contact finger $e^6$. From the switch contact $e^4$, the current is conducted by wire $d'$ to a connection $n^6$ on the interrupter G, going thru contact points $n$ and $m$ and wire $d^2$ to a pair of solenoids S and S' provided with a suitable wire connection $d^3$, and grounded as at Z. The current is returned from the interrupter to the switch E by wire $d^4$ connecting the solenoids to a lead-in contact $e^3$, whence it passes thru the contact finger $e^5$ and the flexible wire $e^7$ to the lead-out connection $e'$ and then along the wire $c^3$ to the tail light C.

The special switch E, to which reference has been made, includes an actuating element in the form of a metal rod or shaft E' slidably mounted in suitable bearings at opposite sides of an insulated housing $E^2$ and carrying within the housing a rectangular block of molded insulating composition $E^4$. The contact arms or fingers $e^5$ and $e^6$, above referred to, are attached to this insulating block $E^4$, and hence are adapted to be moved by the shaft E' so as to make and break the different electrical connections within the switch E and thereby open and close the primary and secondary circuits, as the case may be. A compression spring $E^3$, surrounding the shaft E' and positioned between the housing $E^2$ and the insulating block $E^4$ under slight compression, serves always to force the shaft rearward to the position shown in Fig. 1 in order normally to close the primary circuit by keeping the contact finger $e^5$ and the contact $e$ in engagement with each other. The movement of the shaft E' in the opposite or forward direction is effected by the customary foot brake lever B which passes thru an opening A in the floor board A', being pivotally mounted on a shaft B' beneath the floor board and having a short arm $B^2$ connected as at $B^3$ to a brake rod $b$, all in the usual manner, and this short arm $B^2$ being connected to the shaft E' by a strong tension spring X.

The interrupter G includes a pair of contact-bearing members M and N mounted on a common pivot O, within the frame or housing G'. At its upper end, the member M is provided with the aforementioned contact point $m$ and a screw or other fixture $m^5$ for attaching the wire $d^2$ thereto; and secured to the member M, about midway of its length, is an armature $m'$ arranged in alinement with the cores of the two solenoids S and S', before referred to. Also fastened to the member M, on the side opposite the armature, is a leaf-spring $m^2$ adapted to bear against the end of an adjusting screw M'. Near its base, the member M (which itself is made of fiber to insulate it from the frame G') is formed with a right-angular metal extension $m^3$, to which there is attached at its extremity one end of a tension spring $m^4$, whose other end is attached to the companion contact-bearing member N, the arrangement being such that the spring tends always to separate the contacts $m$ and $n$ regardless of the position of the members M and N.

Near its upper end, the member N has attached thereto, as at $n^2$, in a suitable insulated manner, an inverted U-shaped metal stop plate $n'$, carrying at one side the aforementioned contact point $n$ and provided at the opposite side with a screw or other fixture for the connection therewith of the wire $d'$. The extreme upper end of the member N is arc-shaped and formed with a number of gear teeth $n^3$ meshing with the teeth of a pinion P mounted on a rotatable shaft P' journaled in a pair of brackets T and T' within the frame or housing G'. Fast to the shaft P' is a flywheel F adapted to be rotated by the pivotal movement of the member N, as will presently be described in more detail. A tension spring $n^4$, attached to the member N, as at N', and pulling thereon from an extension $n^5$ of the frame G', tends always to keep the member N in the position shown in Fig. 1 and with the contact points $m$ and $n$ in engagement.

The solenoids S and S' (see Fig. 3), one lying on either side of the member N, are supported by a bracket L, secured to the frame G', and, as before stated, have their respective cores $s$ and $s'$ alined with the armature $m'$ on the member M.

The interrupter G just described may be secured to the automobile in any convenient location, provided it is connected in the circuit between the special switch E and the tail light C. It is herein shown as secured to the floor board A' directly behind the switch.

The operation is as follows: With the parts in their normal positions, as shown in Fig. 1, when the switch $c'$ is turned on, the primary circuit already described is closed and the tail light C burns constantly. When the footbrake lever B is actuated, however, the movement of its short arm $B^2$ draws the rod E' forwardly and moves the fingers $e^5$ and $e^6$ into engagement with the contacts $e^3$ and $e^4$, respectively, thereby closing the secondary circuit and breaking the primary circuit (the latter being broken by the disengagement of the contact $e$ and the finger $e^5$). Due to the fact that the compression spring $E^3$ is much weaker than the spring X, the first slight movement of the brake lever B operates the switch E to open the primary circuit and close the secondary circuit as just described, and the further movement of the lever in applying the brakes is taken up by the yielding or extension of the spring X. With this arrangement, therefore, merely "riding" the foot brake operates the stop signal, thus giving a signal before the actual application of the brakes.

With the secondary circuit closed, the current passes thru the special switch E by way of the lead-in connection $e^2$ and the lead-out contact $e^4$ to the interrupter G in the manner before described. The passage of the current thru the interrupter energizes the solenoids S and S', which thereupon attract the armature $m'$ on the member M, and said member is thus moved toward the solenoids, moving with it as a unit the companion member N. Since the teeth $n^3$ formed on the upper end of the member N mesh with the pinion P, the movement of the member N rotates the flywheel F in a clockwise direction, as indicated by the arrow in Fig. 2. However, by the time the armature $m'$ strikes the cores $s$ and $s'$ of the solenoids, which thereby arrest the movement of the member M, the momentum acquired by the flywheel F is sufficient to keep it rotating and this continued rotation of the flywheel, due to its geared connection with the member N, imparts a further movement to said member and causes it to carry its contact point $n$ out of engagement with the contact point $m$ on the arrested member M, such further movement of the member N being resisted, however, by the spring $n^4$. The separation of the contact points $m$ and $n$ breaks the secondary circuit, whereupon the solenoids are deenergized and the tail light momentarily extinguished. When the secondary circuit is thus broken, the member M is moved by the spring $m^4$ away from the solenoids but is arrested in such movement by the engagement of its upper end with the stop plate $n'$.

When the solenoids are deenergized, the tention springs $m^4$ and $n^4$ act instantly to return the members M and N, respectively, to their normal positions, the return of the member N rotating the flywheel F in a counterclockwise direction under the motive power of the spring $N^4$. As the members M and N are being moved back to their normal positions, their contacts $m$ and $n$ are separated due to the action of the spring $m^4$ as just described, but before the movement of the member N is completed, the companion member M will be arrested by the engagement of the leaf-spring $m^2$ with the set screw M', thereby causing the contact points $m$ and $n$ to close gradually and reenergize the solenoids, which of course tend at once to draw the members M and N in the opposite direction as first described. Before the members M and N can partake of such reverse movement, however, the momentum of the flywheel F acquired in its counterclockwise rotation must be overcome, so that the parts are relieved of the strain which would result by the sudden stoppage of the flywheel. Once the momentum of the flywheel has been overcome and the members M and N started on their return journey the action of the parts is the same as first described starting a new cycle of operation, and these operations are repeated as long as the foot brake is depressed.

Upon release of the brake pedal the switch E returns to its normal position with contact finger $e^5$ bearing against contact $e$. This reestablishes the primary circuit and the tail light assumes its previous stable condition, lighted if switch $c'$ is closed, dark if $c'$ is open.

The simplicity and effectiveness of the device may be better appreciated from a few added remarks. When the secondary circuit is closed by the actuation of the foot brake, and the solenoids S and S' are energized, their work is not only to attract the armature $m'$ on the member M so as to move the contact members M and N as a unit, but in addition to overcome the inertia of the flywheel F in rotating the same and the ever increasing tension of the spring $n^4$. After the contact members have moved and the momentum of the flywheel has acted to separate them, whereby the solenoids are deenergized to permit the rturn of the contact members to their normal positions, the spring $n^4$ in effecting such return has first to overcome the momentum which the flywheel has acquired by its clockwise rotation and then the inertia which resists the rotation of the flywheel in the opposite or counterclockwise direction. Furthermore, at the beginning of the second cycle of operation, and at the beginning of every cycle thereafter, except as aided by the shock absorbing leafspring $m^2$, the solenoids (which are energized shortly before the members M and N assume their normal positions) must likewise first overcome the momentum of the flywheel while rotating in a counterclockwise direction and then the inertia which comes from its rotation in a clockwise direction, besides working against the tension of the spring $n^4$ as at the beginning of the first cycle.

It will be seen, therefore, that the flywheel functions not only to separate the contact points of the interrupter but also to extend the duration of the flashes and the period between flashes, producing a slow, uniform, well regulated, flash such as is most desired for the stop signal of an automobile.

Referring to Fig. 4, there is illustrated therein a method of installing the interrupter in a stop light system. Since the stop light system of an automobile is not connected with the regular lighting system, it is unnecessary to use a special switch as in the embodiment first described, wherein the tail light is used as a stop signal. As illustrated, the system is shown diagrammatically with the battery $C^2$ grounded to the frame of the automobile, as at $C^3$, and the stop light Y grounded, as at Y', and showing a switch W, which may be any ordinary stop light switch. The connection between the foot brake lever arm $B^2$ and the stop light switch W is omitted in the drawings, it consisting usually of a tension spring such as the spring X shown in Fig. 1.

Ordinarily, when the foot brake lever B is depressed to actuate the braking system of the automobile, the switch W is closed and the current travels from the battery $C^2$ along the wire $w$, thru the switch W, the wire $w'$ and the wire $w^2$ (the latter shown by the dotted lines) to the stop light Y. However, with the interrupter G installed, the current passes from the battery thru the interrupter to the stop light, entering the interrupter thru the connection $j$, passing thru the contact points $j'$ and $j^2$ and then to the solenoids, designated by the letter K, by means of the wire $w^4$, which is connected thereto, as at $w^5$, the solenoids being suitably grounded, as at Z', and from the solenoids the current is transmitted to the stop light Y by means of the wire $w^6$. The operation of the interrupter in this embodiment is the same as before and, therefore, need not again be described.

While the interrupter has been designed primarily for use in an automobile stop light system, it will be understood that it is capable of more general application and may be used in any environment where the flashing period as controlled by a flywheel is acceptable or desired, or may be used with other signals such as bells, buzzers, horns and the like.

Having thus described my invention, what I claim is:

1. In or for an electric circuit, a flasher unit including a pair of independently movable contact-bearing members independently mounted on a common axis, means for moving the members as a unit a limited distance in one direction while in circuit closing condition, and means actuated by the unit movement of said members for effecting the independent continued movement of one of the members in the same direction to break the circuit.

2. In or for an electric circuit, a flasher unit including two independently movable contact-bearing members independently mounted on a common axis, a pair of solenoids arranged to move the members as a unit a limited distance in one direction while in circuit closing condition, means actuated by the unit movement of said members for effecting the independent continued movement of one of the members in the same direction to break the circuit and deenergize the solenoids, and means for returning the members to their original position and reclosing the circuit.

3. In or for an electric circuit, a flasher unit including a frame, two independently movable contact-bearing members independently mounted in the frame on a common axis and normally in contacting relation to close the circuit, an armature arranged on one of the members, a solenoid adapted when energized to attract the armature and move the members as a unit until said armature strikes against the solenoid and thereby arrests the member on which it is arranged, and means energized by the movement of the other of said members during the unitary movement of the members and adapted to continue the movement of said other member after the armature bearing member has come to rest to separate the contacts and break the circuit.

4. In or for an electric circuit, a flasher unit including a frame, a member pivotally attached to the frame, said member bearing an armature and a contact point, two solenoids secured to the frame and adapted when energized to attract the armature, a second member pivotally attached to the frame and arranged between the solenoids and formed at its end with a toothed segment, a contact point arranged on said member and adapted normally to contact with the point on the other member, thereby to close the circuit and energize the solenoids whereby both of the members are moved as a unit until the armature bearing member is arrested by the solenoids, and a device in engagement with the toothed segment and actuated by the unit movement of the members, said device operating by its own power to disrupt the unitary movement of the members and thereby break the circuit.

5. In or for an electric circuit, a flasher unit including a pair of independently movable contact-bearing members independently mounted on a common axis, means for moving the members as a unit a limited distance in one direction while in circuit closing condition, and means actuated by the unit movement of said members for effecting the independent continued movement of one of the members in the same direction to break the circuit, said actuated means for breaking the circuit including a flywheel rotated by the unit movement of the contact members and which by its momentum effects the continued movement of said one member.

6. In or for an electric circuit, a flasher unit including a pair of independently movable contact-bearing members mounted on a common axis, means for moving the members as a unit while in circuit closing condition, and means actuated by the unit movement of said members for effecting the independent movement of one of the members to break the circuit, the means for breaking the circuit including a flywheel mounted on a rotatable shaft, and a pinion mounted on the shaft and engaging a toothed segment formed on one of the contact-bearing members, the momentum of the flywheel causing said member to move after the other member has been arrested, thereby separating the contact points on the two members.

7. In or for an electric circuit, a flasher unit comprising two spring-actuated pivotally mounted members having contact points normally bearing against each other, said members being independently movable and mounted on a common axis, an armature on one of the members, a pair of solenoids arranged when energized to attract the armature and thereby move the corresponding member until the armature strikes the solenoids, said member moving the other member before it, and a flywheel actuated by the movement of the last-mentioned member and adapted by its momentum to continue the movement of said member after the armature bearing member is arrested by the solenoids, whereby the contact points are separated and the circuit broken, said last mentioned member having a direct driving connection with the flywheel.

8. In or for an electric circuit, a flasher unit comprising a pair of contact-bearing members mounted to rock about a common axis, a spring connected at its opposite ends to the respective members tending to separate them, a spring connected alone to one of the members and tending constantly to hold them in a normal position, an armature on the other member, a solenoid for drawing the latter member toward it and thereby moving both members as a unit in opposition to the second spring, a flywheel, and gearing connecting the flywheel to the non-armature bearing member, said parts functioning substantially in the manner described.

9. In or for an electric circuit, a flasher unit comprising two independently movable contact-bearing members mounted on a common axis, means adapted to move the members as a unit a predetermined distance, a spring to resist such unit movement of the members, and a flywheel actuated by one of the members during said unit movement through the predetermined distance and acting by its momentum to continue the movement of said member, whereby the members are separated and the circuit broken, said actuating member having a direct connection with the flywheel.

MARION J. RICH.